United States Patent
Koegel

[15] 3,681,661
[45] Aug. 1, 1972

[54] ADJUSTABLE ACCELERATION RESPONSIVE SOLID STATE CONTROL CIRCUIT

[72] Inventor: James H. Koegel, Placentia, Calif.
[73] Assignee: Robertshaw Controls Company, Richmond, Va.
[22] Filed: Jan. 11, 1971
[21] Appl. No.: 105,463

[52] U.S. Cl. ............... 317/22, 317/36 TD, 317/5, 318/128, 318/460, 307/117, 307/121
[51] Int. Cl. ........................ H02h 5/00, H02p 7/00
[58] Field of Search ...... 307/117, 121; 318/460, 128; 317/22, 36 TD, 5

[56] References Cited
UNITED STATES PATENTS 2,966,617  12/1960  Hardway ............... 317/5
3,553,482  1/1971  Taxis ............... 307/121
3,440,491  4/1969  Tenenbaum ............... 317/22
3,381,176  4/1968  Riebs ............... 317/22

Primary Examiner—J. D. Miller
Assistant Examiner—Harvey Fendelman
Attorney—Brenner, O'Brien & Guay

[57] ABSTRACT

A solid state control circuit for controlling the operative state of a monitored apparatus in response to vibration or acceleration disturbances, including an adjustable start delay network enabling the monitored apparatus to reach normal operating conditions prior to initiating a control sequence, an adjustable sample delay network adapted to sample the acceleration experienced by the monitored apparatus a number of times prior to removing power from the apparatus, and an adjustable monitor delay network connected to shutdown the monitored apparatus after a preselected number of samples such that the apparatus is safely deenergized only in response to acceleration disturbances which persist over a given period of time.

19 Claims, 6 Drawing Figures

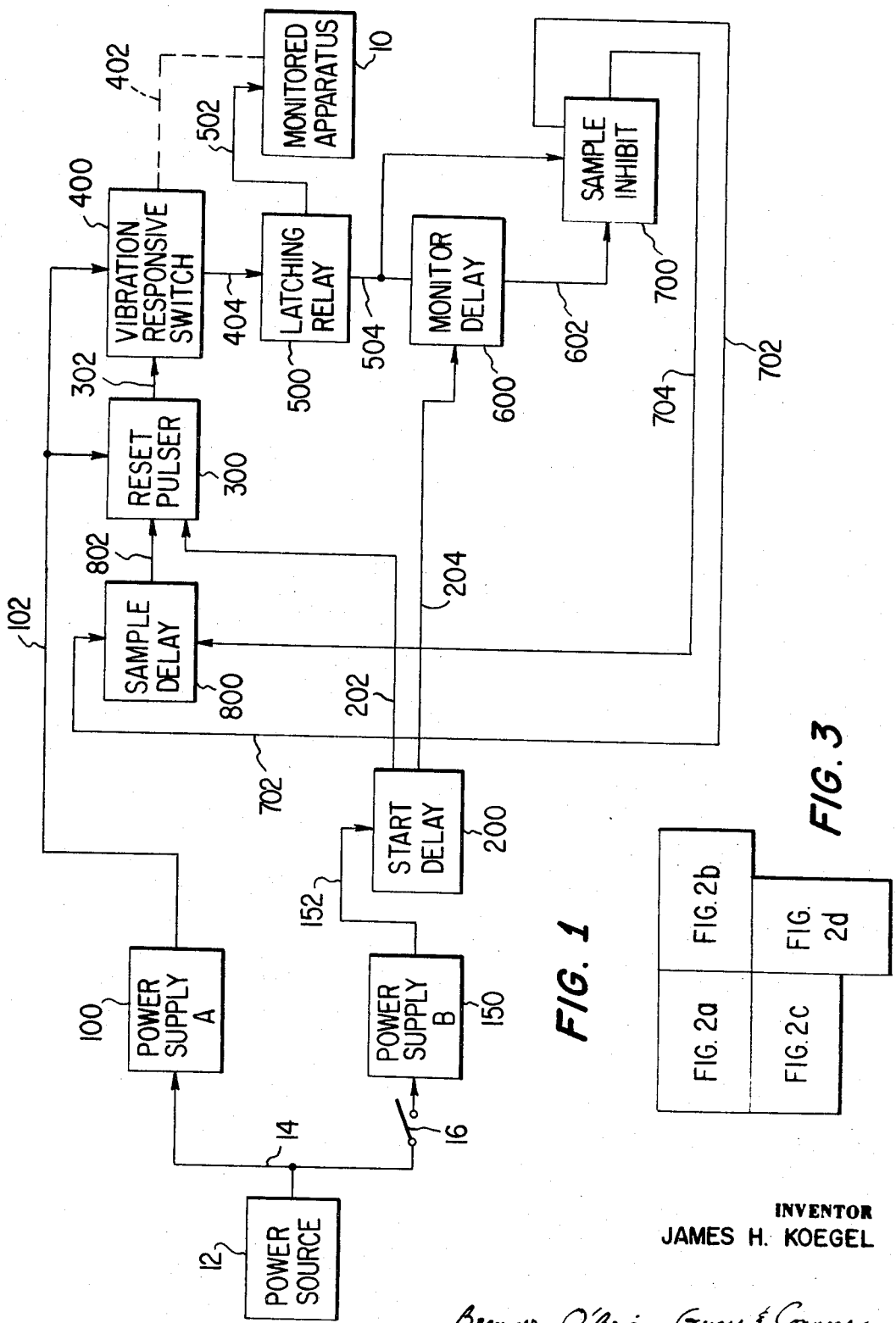

INVENTOR
JAMES H. KOEGEL

BY Brenner, O'Brien, Guay & Connors

ATTORNEYS

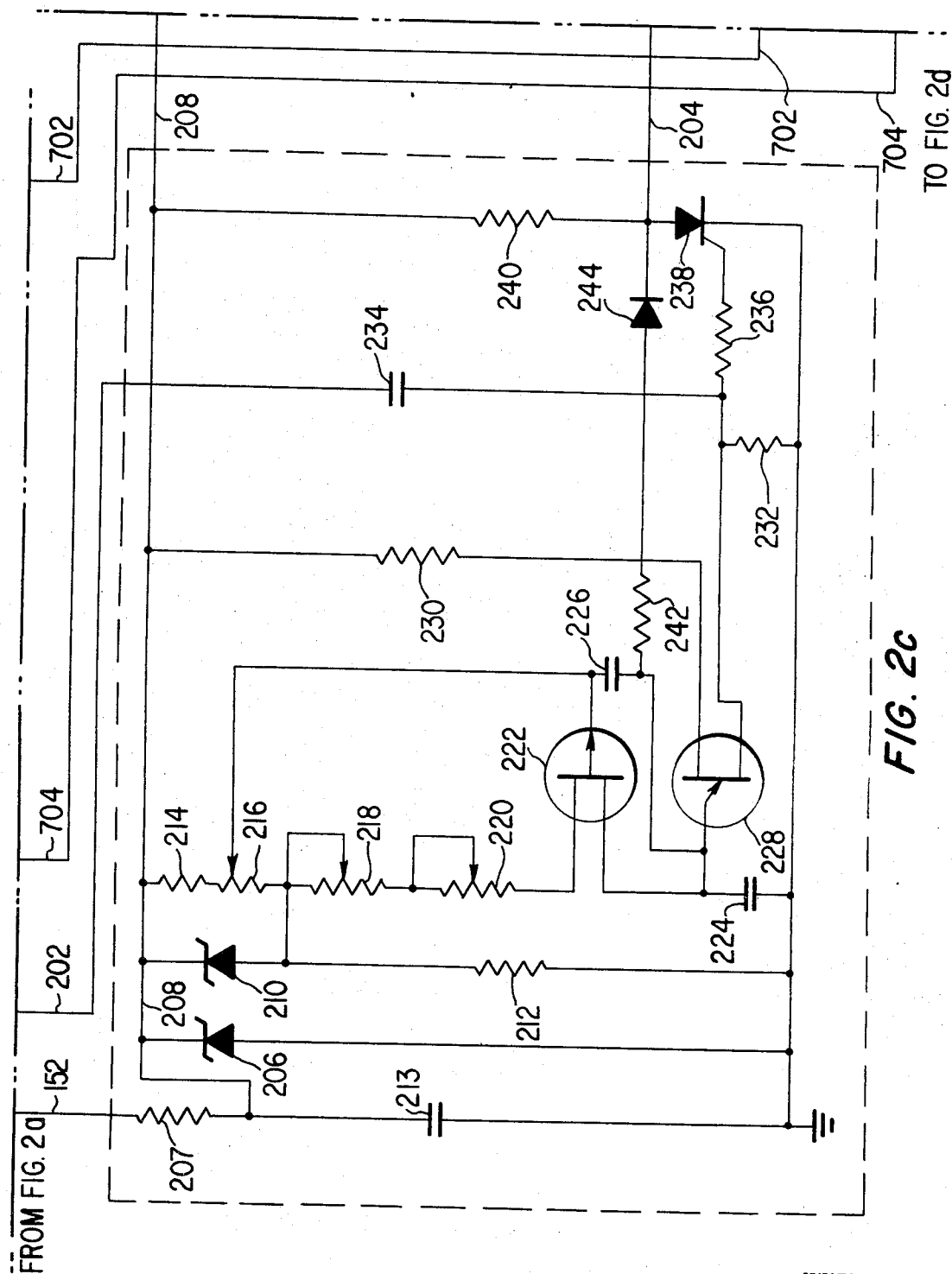

ADJUSTABLE ACCELERATION RESPONSIVE SOLID STATE CONTROL CIRCUIT

BACKGROUND OF THE INVENTION

1. Field of the Invention:

The present invention relates to acceleration or vibration responsive systems and more particularly to a solid state control circuit which is adjustably responsive to various acceleration disturbances.

2. Description of the Prior Art:

Various apparatus having moving or rotating parts often experience undesired acceleration forces or vibrations during operation which, if allowed to persist over a given period of time, may cause extensive damage requiring costly and time consuming repairs. A number of devices have been developed in the past to respond to peak disturbances of this type for controlling an electrical switch or switches connected so as to safely shutdown the machinery before such damage occurs.

A typical device of this type is shown and described in U.S. Pat. No. 2,966,617 in which an electrical switch is normally placed in a first or standby state and will remain in such state until a peak acceleration disturbance is experienced. Thereafter, the switch is moved to a second or tripped state in which it remains until reset by a suitable electrical signal. It should be appreciated that these devices are essentially "single response" devices, that is, they are responsive to a single peak disturbance regardless of the duration thereof. While such units may be conveniently employed to control a particular apparatus in response to single or transient disturbances, it is often desired to control the monitored apparatus only in response to disturbances having a preselected duration. Such is the case, for example, where frequent starting and stopping of the apparatus renders manual resetting unfeasible or where the apparatus is remotely or inaccessibly installed.

While the prior art, as exemplified by the aforementioned patent, is generally cognizant of electrical circuits providing timed delays and adapted for use with "single peak" disturbance responsive devices, such prior art circuits typically employ electromechanical and/or thermal time delay relays and are not adapted to be adjusted to respond to disturbances having varying durations.

Thus, while the problems associated with the development of control circuits responsive to relatively long duration acceleration disturbances have long been known, a simple, adjustable acceleration responsive control circuit utilizing reliable solid state components has heretofore been unavailable.

SUMMARY OF THE INVENTION

Accordingly, it is an object of the present invention to construct a solid state acceleration responsive control circuit.

The present invention has another object in the construction of an acceleration responsive circuit which may be easily adjusted to respond to acceleration disturbances which persist over various preselected periods of time.

The present invention is summarized in an acceleration responsive control circuit including a switch having a first position and a second position, the switch moving to its second position in response to a predetermined acceleration disturbance and being resettable to its first position upon receipt of a reset pulse; a sampling network connected with the switch and responsive to movement of the switch to its second position to generate a reset pulse for the switch after a first delay interval; and a monitoring network connected with the switch and the sampling network and having a first state and a second state for providing a control function, the monitoring network normally assuming its first state and being responsive to movement of the switch to its second position a predetermined number of times during a second delay interval greater than the first delay interval to assume its second state whereby the monitoring network assumes its second state only in response to acceleration disturbances which persist for the duration of the second delay interval.

Another object of this invention is to sample the degree of vibration of a monitored apparatus a plurality of times prior to initiating a system shutdown.

The present invention has a further object in that a plurality of individually adjustable solid state timing networks cooperate with a "single response" acceleration responsive switch to control a monitored apparatus.

A further object of this invention is to control a monitored apparatus for undesired acceleration disturbances only after a preselected startup delay period and only is such disturbances persist over a given period of time.

Some of the advantages of the present invention reside in its durable solid state construction, ability to be adjusted to respond to considerably different time duration acceleration disturbances, and ability to sample the operation of a monitored apparatus a number of times prior to initiating a power shutdown.

Other objects and advantages of the present invention will become apparent from the following description of a preferred embodiment taken in conjunction with the accompanying drawings.

BRIEF DESCRIPTION OF THE DRAWINGS

FIG. 1 is a block diagram of a preferred embodiment of an adjustable acceleration responsive solid state control circuit according to the present invention;

FIGS. 2a–2d are schematic diagrams which, when taken together, illustrate the circuit details of the control network of FIG. 1; and FIG. 3 is a diagrammatic representation showing the relationship of FIGS. 2a-2d.

DESCRIPTION OF THE PREFERRED EMBODIMENT

Figure 2A:
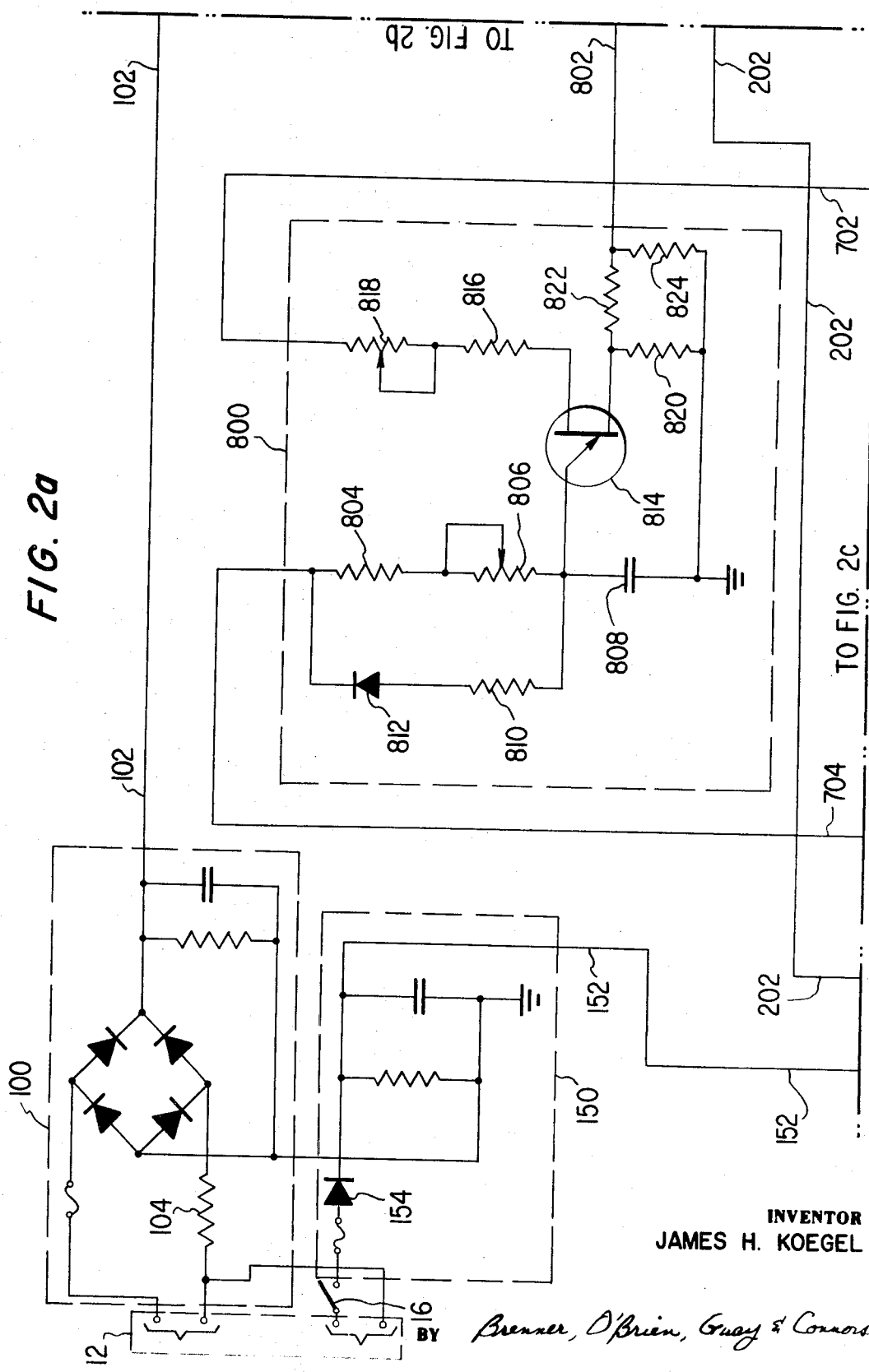

Referring to FIG. 1, a block diagram of a control circuit according to the present invention is illustrated for use in controlling the application of electrical energy to any desired apparatus 10, such as a motor, in response to vibration or acceleration forces experienced thereby which persist over a given period of time.

The circuit receives operating power from a standard AC or DC source, represented by block 12, via branched line 14 which continuously feeds a first power supply network 100 and supplies power through a switch 16 to a second power supply 150. Switch 16 is preferably coupled with monitored apparatus 10 such that power supply 150 will be energized whenever the apparatus 10 is turned on. Both power supplies 100 and 150 are simple rectifier circuits designed to operate from a wide range of AC or DC input supply voltages for providing rectified DC operating potential for the timing and switching networks of the control circuit of the present invention.

The output from power supply 150 is fed via line 152 to a start delay network 200 which, after a delay interval sufficient to allow the monitored apparatus to reach its normal operating state, supplies an electrical pulse via line 202 to a reset pulser 300. Reset pulser 300 receives operating potential from power supply 100 via power bus 102 and, upon receipt of the pulse from start delay network 200 feeds a reset pulse over line 302 to a vibration responsive switch 400. Switch 400 is adapted to be mechanically linked to monitored apparatus 10, as schematically represented by dashed line 402, such that acceleration disturbances at apparatus 10 will be experienced by the vibration responsive switch 400 causing its actuation.

Vibration responsive switch 400 may be of any suitable type such as that shown and described in U.S. Pat. No. 2,966,617. The switch 400 is designed to be placed in an active or standby mode upon receipt of the electrical pulse from reset pulser 300 and thereafter will cause the actuation of a set of switch contacts when subjected to peak acceleration disturbances of a value dependent upon the preselected sensitivity of the device. After the switch has thus been tripped, it will remain in such state until once again reset to its standby mode. The device can therefore be characterized as an acceleration or vibration responsive device in the nature of a resettable latching relay.

Vibration responsive switch 400 is coupled via line 404 to a latching relay 500 which is connected to control the application of electrical power to monitored apparatus 10 by line 502 and which is further coupled to supply operating potential a monitor delay circuit 600 and to a sample inhibit network 700 by a branched line 504.

Monitor delay network 600 is connected by line 204 to the start delay circuit 200 so as to receive an enabling signal therefrom after termination of the start delay interval thereby conditioning the monitor delay circuit for the initiation of a primary or monitor timing interval upon the subsequent occurance of a peak acceleration disturbance as detected by vibration responsive switch 400. Both prior to the expiration of the start delay interval, that is, prior to the conditioning or enabling of monitor delay circuit 600 by the signal on line 204, and after the expiration of the monitor timing interval, a control signal is fed via line 602 to a sample inhibit or feedback circuit 700. The sample inhibit circuit is coupled to a sample delay network 800 and supplies operating potential thereto over line 702 whenever the monitor delay network 600 and sample inhibit circuit 700 are energized, and further, generates an inhibit signal on line 704 to inhibit the operation of sample delay network 800 whenever the control signal on line 602 is produced by the monitor delay network 600.

The sample delay network 800 is connected by line 802 to reset pulser 300 for activating or triggering the reset pulser after a secondary or sample delay interval so as to reset the vibration responsive switch 400. Thus, upon receipt of operating potential from sample inhibit network 700, the sample delay network 800 will supply a triggering pulse to reset pulser 300 after the sample delay interval, except when inhibited (during startup and after the expiration of the monitor delay interval) by the signal on line 704 from sample inhibit network 700. It is briefly noted at this point that the monitor delay interval is designed to be approximately 5-½ times that of the sample delay interval so that the condition of monitored apparatus 10 may be sampled five times before it is shutdown.

In operation, whenever the monitored apparatus 10 is energized, switch 16 will be closed and operating potential will be supplied to start delay circuit 200. At this time, the reset pulser 300 and the vibration responsive switch 400 will receive operating potential via power bus 102 and the latching relay 500 will be in its standby or normal position providing continuity between the power source and monitored apparatus 10. In addition, the sample delay circuit 800 will be inhibited by a signal from inhibit network 700.

After the expiration of the startup delay, the monitor delay network 600 will be conditioned for operation by a signal on line 204, and recognizing the fact that peak disturbances may well be experienced during startup and may cause the vibration responsive switch 400 to trip, a pulse will be sent via line 202 to actuate the reset pulser 300 for resetting the vibration responsive switch 400. If the monitored apparatus 10 is operating normally and not experiencing vibration or excessive acceleration, the circuit will remain in this standby condition until such a disturbance occurs.

In the event of such a disturbance, switch 400 will be tripped causing energization of the monitor delay circuit 600, the sample inhibit circuit 700 and the sample delay circuit 800. Consequently, the inhibit signal from sample inhibit network 700 will be removed and both the sample delay and monitor delay networks will begin timing the sample and monitor delay intervals, respectively. The monitor delay network 600 controls the operation of latching relay 500 so that the monitored apparatus 10 will not be shutdown until the expiration of the monitor delay interval which, as noted above, is approximately 5-½ times that of the sample delay network 800.

After the expiration of the sample delay interval, reset pulser 300 will be triggered to thereby apply a short pulse to vibration responsive switch 400 for resetting the same. If the disturbance experienced by monitored apparatus 10 persists, the vibration responsive switch 400 will again be tripped and a second "sample" will be made. The sampling cycle will be repeated in this same manner until the end of the fifth sample at which time the monitor delay interval will expire and the monitor network will energize latching relay 500 to shutdown the monitored apparatus 10. If the disturbance is of a minor nature or if it is merely a single peak, as may be caused by the backfire of an internal combustion engine, for example, the second or third "sample" will reset the vibration responsive switch 400 which will thereafter remain untripped. Accordingly the monitor delay network will not have sufficient time to fire and the system will revert to its quiescent or standby state described above.

In this manner, the circuit of the present invention provides for the positive and safe shutdown of the monitored apparatus 10 in response to only those vibrations or disturbances which persist for the preset monitor delay interval and will not unnecessarily shutdown the device 10 during startup or in the event of single acceleration peaks or upon the occurance of merely transitory disturbances.

Referring now to the circuit details of the present network, FIGS. 2a–2d, when taken together as diagrammatically shown in FIG. 3, represent a complete schematic diagram of a preferred embodiment of the control circuit of the present invention.

As shown in FIG. 2a, power supplies 100 and 150 are fed from a standard AC or DC power source 12 with power supply 150 controlled by switch 16. Power supply 100 is a conventional full-wave diode-bridge rectifier with a suitable filter adapted to provide a DC supply of approximately 150 VDC to 180 VDC to power bus 102. The switched power supply 150 is a half-wave rectifier and filter having its return line coupled through one section of the diode-bridge of supply 100 such that the two power supplies have a common ground connection. Both supplies are protected against high charging currents by a resistor 104. As with power supply 100, the output of supply 150 is approximately 150 VDC to 180 VDC with supply 150 protected against reverse spike damage by an avalanche diode 154.

Power from supply 150 is fed via line 152 to start delay network 200 (FIG. 2c) which is basically a capacitor controlled unijunction transistor timer driven from a field-effect transistor (FET) used as a constant current source. When power is supplied by power supply 150, a Zener diode 206 connected in series with a resistor 207 to ground fires so as to provide a regulated voltage at a power bus 208. A second Zener diode 210 is connected in series with a resistor 212 between bus 208 and ground as is a capacitor 213 and a series network formed by a fixed resistor 214, a potentiometer 216, a pair of variable resistors 218 and 220, the source-drain terminals of an FET constant current generator 222 and a charging capacitor 224. The wiper arm of potentiometer 216 is connected with the gate electrode of FET 222, and a high voltage transient protecting capacitor 226 is connected across the gate and drain electrodes of the transistor The junction of capacitor 224 and the drain electrode of FET 222 is coupled to the emitter electrode of a unijunction transistor 228 having its base-two electrode tied to bus 208 by a biasing resistor 230 and its base-one electrode returned to ground by another biasing resistor 232.

Figure 2B:
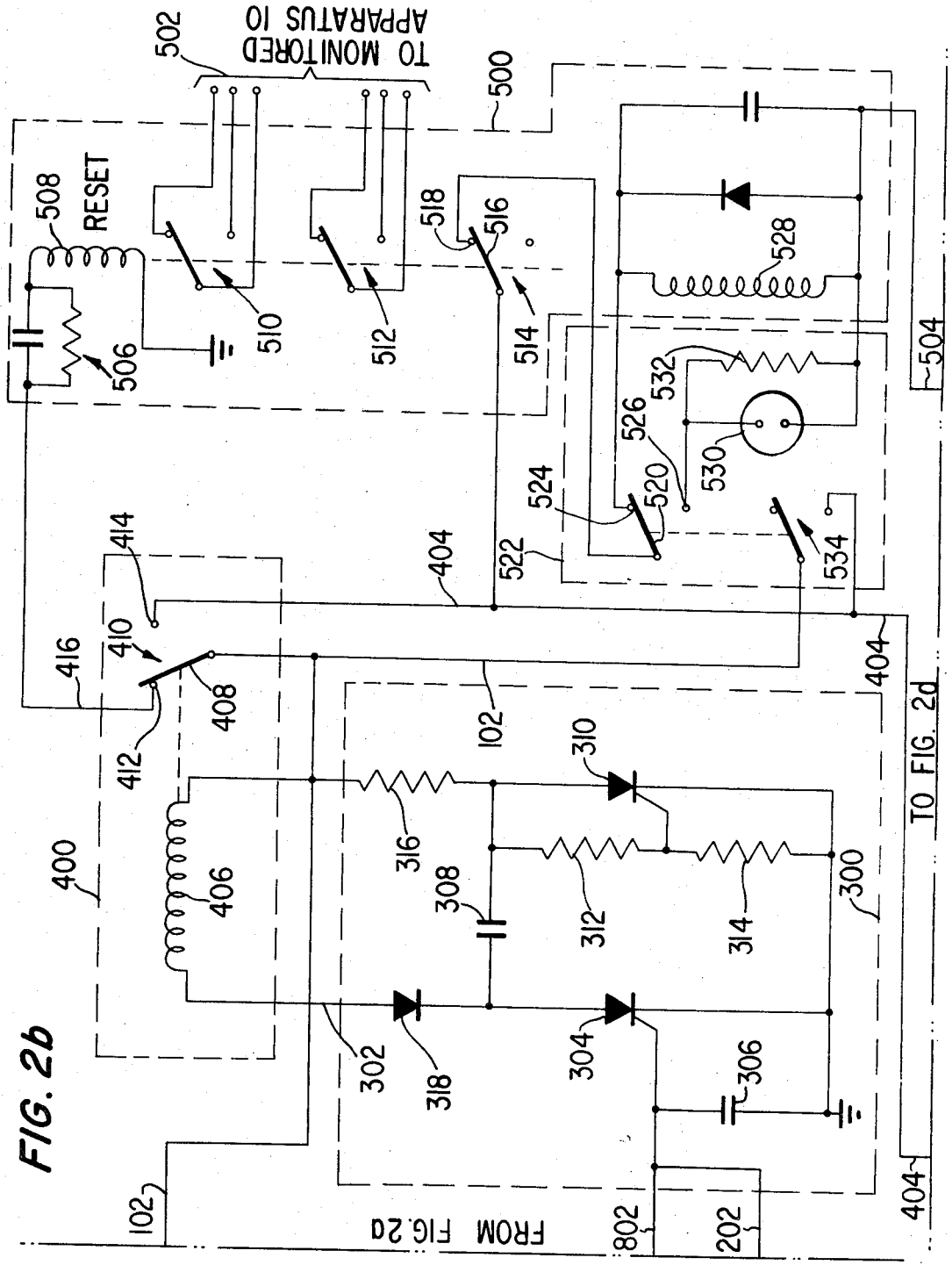
Figure 2D:
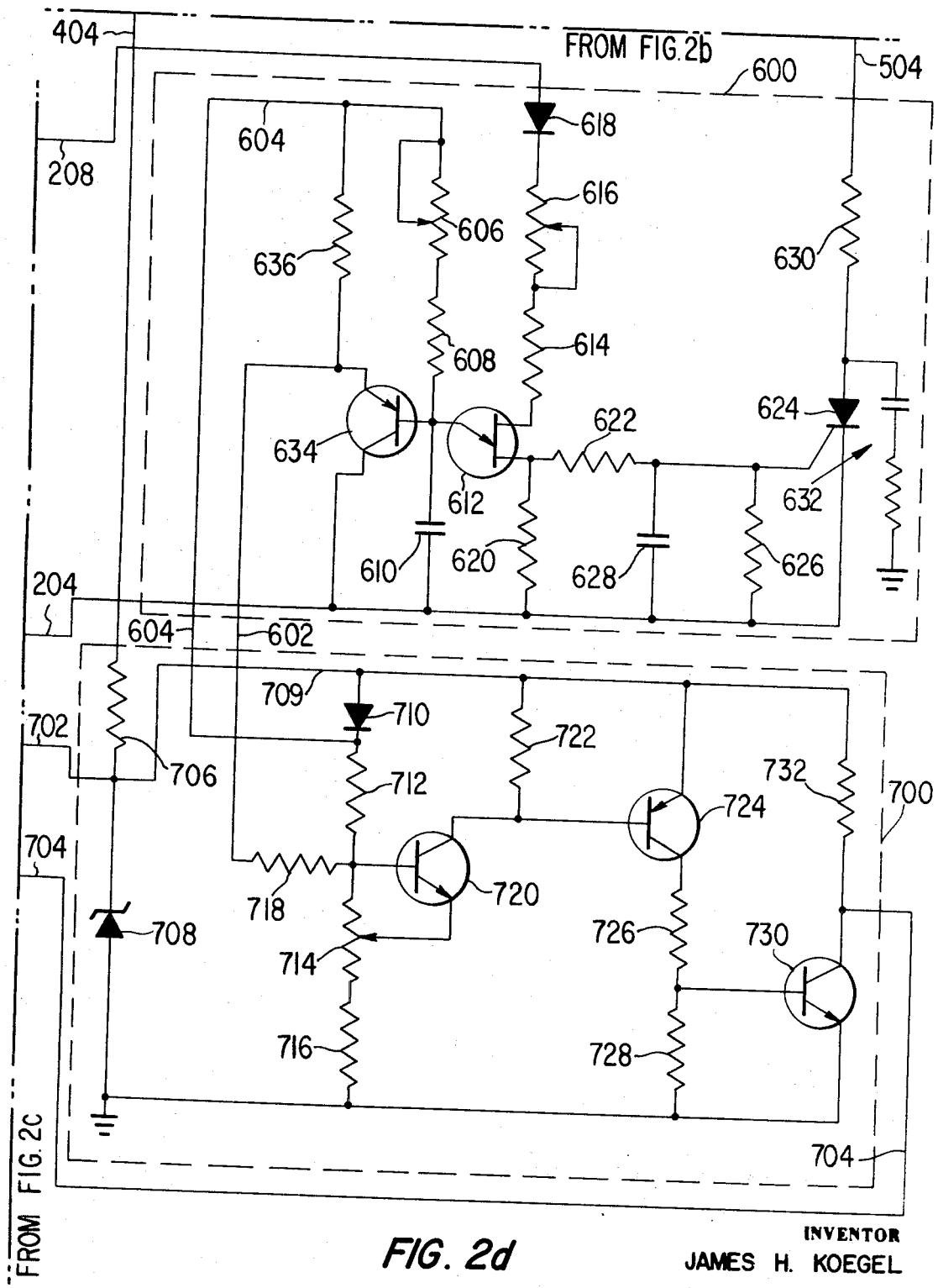

The output signal from unijunction transistor 228 is taken from the base-one electrode and is coupled through a pulse forming capacitor 234 to line 202 which feeds reset pulser 300 (FIG. 2b). The output signal is also fed through resistor 236 to the gate of a solid state controlled switch, such as a silicon controlled rectifier (SCR) 238 having its cathode electrode grounded and its anode electrode tied to bus 208 via a resistor 240. A discharge path for capacitor 224 when SCR 238 fires is provided by a resistor 242 and a diode 244 connected in series between capacitor 224 and the anode of the SCR. Line 204, which feeds the monitor delay circuit 600, is connected to the anode of SCR 238 as illustrated.

The output pulse from start delay network 200 on line 202 is coupled to the input of reset pulser 300 (FIG. 2b) which is a monostable multivibrator using solid state controlled switches, preferably of the SCR type. Line 202 is connected to the gate electrode of an SCR 304 which is protected against undesired triggering by noise and R-F spikes by a capacitor 306. The cathode of SCR 304 is grounded and its anode electrode is coupled by capacitor 308 to the anode of a second SCR 310 and to a voltage divider formed by a pair of series connected resistors 312 and 314 which are returned to ground. The junction of resistors 312 and 314 is connected to the gate electrode of SCR 310 which has its cathode grounded and its anode coupled to power bus 102 through a resistor 316.

The output pulse produced by reset pulser 300 is taken from the anode of SCR 304 and coupled by diode 318 to line 302 and thence to one side of a reset coil 406 of vibration responsive switch 400. The other side of coil 406 is connected with power bus 102 as is a movable contact 408 of a single-pole-double-throw switch 410 which is magnetically coupled with coil 406. Switch 410 includes first and second fixed contacts 412 and 414 and is illustrated in its reset or standby position with contacts 408 and 412 closed and contacts 408 and 414 open. Vibration responsive switch 400 is mechanically linked to monitored apparatus 10 so as to experience vibration and shock produced thereby.

As briefly noted above and as described in detail in U.S. Pat. No. 2,966,617, vibration responsive switch 400 is responsive to shock or acceleration forces experienced by apparatus 10 for moving movable contact 408 away from contact 412 and into engagement with contact 414. The switch 410 will thereafter remain in such position until coil 406 is energized whereupon the switch 410 reverts to the position illustrated in FIG. 2b and will remain in such position until a subsequent disturbance occurs. It can thus be appreciated that such devices are "single response" latching devices in that they remain reset until tripped by a single disturbance and thereafter remain tripped until again reset.

Fixed contact 412 of switch 410 is connected by line 416 to a pulse forming network 506 for a reset coil 508 of latching relay 500. Network 506 assures energization of reset coil 508 upon the resetting of vibration responsive switch 400 while at the same time preventing the coil 508 from constantly drawing large amounts of current when the system if quiescent. The latching relay 500 includes three single-pole-double-throw switches 510, 512 and 514 which are ganged together for simultaneous operation with switches 510 and 512 connected via lines 502 for suitably controlling power to monitored apparatus 10 (FIG. 1). Switch 514 has its movable contact 516 connected via line 404 to fixed contact 414 of switch 410 and has a fixed contact 518 connected to the movable contact 520 of a push-to-test switch 522.

Movable contact 520 cooperates with a pair of fixed contacts 524 and 526 with the former connected through a diode-capacitor protected latching coil 528 of relay 500 to line 504, and the latter connected through a parallel connected neon lamp 530 and resistor 532 to line 504. A second set of contacts 534 are ganged with movable contact 520 and are connected in parallel with contacts 408 and 414 of switch 410.

Line 504 is connected with monitor delay network 600 (FIG. 2d) which includes a capacitor controlled unijunction transistor timer set to the desired monitor delay interval. The charging circuit for delay network 600 receives operating potential from line 604 which is connected through a series coupled variable resistor 606, a fixed resistor 608 and a charging capacitor 610 to ground. The junction of resistor 608 and capacitor 610 is connected with the emitter electrode of a unijunction transistor 612 which has its base-two electrode connected to power bus 208 by a series network formed of a fixed resistor 614, a time delay variable resistor 616 and a diode 618. The base-one electrode of transistor 612 is coupled to ground through a biasing resistor 620 and is also connected by a resistor 622 to the gate electrode of a solid state controlled switch such as SCR 624. A resistor 626 and a capacitor 628 are connected in parallel between the gate of SCR 624 and ground with capacitor 628 serving to prevent false triggering by noise or R-F spikes. The cathode of SCR 624 is connected to ground and the anode electrode thereof is coupled through resistor 630 to line 504 and is further coupled to ground through an R-C network 632.

The potential developed across capacitor 610 is also used to actuate sample inhibit network 700. In this regard, capacitor 610 is connected to the base of an emitter-follower transistor 634 which has its collector electrode grounded and its emitter tied to power line 604 by a resistor 636. The emitter of transistor 634 is coupled by line 602 to the input of sample inhibit network 700 which receives operating potential from vibration responsive switch 400 via line 404. Line 404 is connected through a resistor 706 to a Zener diode voltage regulator 708 which is returned to ground as illustrated. A power bus 709 is connected to the junction of resistor 706 and diode 708 as is line 702, which supplies operating potential to sample delay network 800. A diode 710 is connected between power line 709 and a bias network formed of a fixed resistor 712, a potentiometer 714 and a fixed resistor 716 connected in series to ground. Line 604 is coupled to the junction of diode 710 and resistor 712 with line 602 coupled to the junction of resistors 712 and 714 by another resistor 718.

The junction of resistors 712, 714 and 718 is connected to the base electrode of an NPN transistor 720 which has its emitter connected to the wiper arm of potentiometer 714 and its collector coupled to power line 709 via a resistor 722. The collector of transistor 720 is also connected to the base electrode of a PNP transistor 724 having its emitter tied directly with bus 709 and its collector electrode returned to ground through series connected resistors 726 and 728. The junction of resistors 726 and 728 is connected to the base electrode of another NPN transistor 730 which has its emitter grounded and its collector electrode connected to power line 709 through a resistor 732. The inhibit output signal is taken from the collector of transistor 730 and fed via line 704 to the sample delay circuit 800, illustrated in FIG. 2a.

Sample delay network 800 is a capacitor controlled unijunction timing circuit and includes a series connected resistor 804, variable resistor 806 and charging capacitor 808 which are coupled from line 704 to ground. A discharge or bleed path for capacitor 808 is provided by a resistor 810 and a diode 812 which are connected in series across resistors 804 and 806. A unijunction transistor 814 is connected at its emitter electrode to the junction of resistor 806 and capacitor 808 and has its base-two electrode connected through a fixed resistor 816 and a series connected variable resistor 818 to line 702. The base-one electrode of unijunction transistor 814 is connected to ground through a parallel network including a resistor 820 and a pair of series connected resistors 822 and 824. The output of the sample delay network 800 is taken from the junction of resistors 822 and 824 and coupled via line 802 to reset pulser 300.

In describing the operation of the present invention, it will be assumed that the control circuit is to be utilized in connection with a motor-driven compressor acting as the monitored apparatus 10 with the vibration responsive switch 400 suitably mounted to the compressor and switches 510 and/or 512 of latching relay 500 connected in the compressor power supply line.

Upon energization of the compressor 10, switch 16 will be closed and operating power will be supplied to power supply 150. Power supply 150 will then feed DC operating potential via line 152 to the input of start delay circuit 200. Zener diode 206 than fires supplying a regulated potential to bus 208, and Zener diode 210 fires supplying a regulated bias potential to FET 222. The FET supplies a constant current to the charging capacitor 224 of a sufficient value to assure firing of unijunction transistor 228. Capacitor 224 thereafter begins to charge with the start delay timing determined by the peak point voltage of unijunction transistor 228 and the value of capacitor 224. Resistors 216, 218 and 220 enable adjustment of the current provided by FET 222 and accordingly the timing interval required for firing of unijunction transistor 228 and also enable enough adjustment to accommodate allowable variations in the parameters of transistor 222.

It is noted that resistor 220 is used to control the length of the start delay interval with resistors 218 and 216 used to calibrate the low and high ends of the delay potentiometer control. One technique of calibrating the start delay network is to disconnect capacitor 224 at the junction to the drain electrode of FET 22 and to measure the current flowing therethrough. With resistor 220 set to the low end of the dial, resistor 218 is adjusted for a first preselected current flow, and with resistor 220 set at the high end, resistor 216 is adjusted for a second preselected current flow. By examining the transconductance characteristics of FET 222, the above current values can be readily calculated so as to provide proper operation of the circuit over a wide delay-time range. In one experiment, for example, using a 33 VDC regulated supply on bus 208, a 6.2V Zener diode 210, a 10 microfarad capacitor 224 and a 2N5461 FET 222, the delay-time range through which start delay circuit 200 could be adjusted was found to be between five seconds and 240 seconds.

During the start delay interval, reset pulser 300 and vibration responsive switch 400 receive operating potential via power bus 102 from power supply 100, and latching relay 500 will be in its normal or standby position as illustrated. Thus, continuity will be provided between the compressor (monitored apparatus 10) and its power source, and the compressor will begin to come up to normal operating speed.

At the same time, SCR 238 (FIG. 2c) of start delay circuit 200 will be "off" such that line 204 (feeding monitor delay network 600) will be ungrounded. Since line 204 is the ground return for monitor delay 600 and since power bus 208 is supplying a DC potential to monitor delay 600, the potential at capacitor 610 will be "high" or very nearly equal to the supply potential on bus 208 such that an inhibit initiate signal will be fed by emitter-follower transistor 634 to the input of sample inhibit circuit 700. This signal switches transistor 720 "on" thereby turning transistor 724 "on" which in turn forward biases transistor 730. With transistor 730 forward biased, its collector potential is near zero volts thus tying line 704 to ground. With line 704 grounded, capacitor 808 in sample delay network 800 is prevented from charging such that the sample delay network 800 is inhibited from operating.

THus, after initial energization of the system and prior to the expiration of the start delay interval; i.e., prior to the firing of unijunction transistor 228 by the potential across capacitor 224, latching relay 500 will be in the position illustrated in FIG. 2b, monitor delay network 600 will be inhibited by the discontinuity in its ground return path, sample inhibit network 700 will hold line 704 to ground, and sample delay network 800 will be inhibited by the disabling of charging capacitor 808. In addition, the reset pulser 300 will not be actuated and accordingly, no current drain will be produced by reset coil 406 of switch 400.

The start delay interval will then run, during which time the compressor will be permitted to come up to normal running speed. Any acceleration disturbances experienced by the compressor at this time will not cause actuation of the latching relay 500 since both the sample delay network 800 and monitor delay network 600 will be inhibited from operating. However, it should be noted that acceleration disturbances during startup will cause vibration responsive switch 400 to trip.

When the peak point voltage of unijunction transistor 228 is reached by the charge across capacitor 224, signalling the end of the start delay interval, the unijunction transistor fires producing a voltage spike at its base-one electrode. This voltage spike fires SCR 238 which ties line 204 to ground completing a ground return path for monitor delay network 600 thereby conditioning it for operation and removing the inhibit initiate signal across capacitor 610. At this same time, the signal from unijunction transistor 228 is fed over line 202 to the input of reset pulser 300.

Upon receipt of the pulse on line 202, SCR 304 of reset pulser 300 will fire grounding capacitor 308. The grounding of capacitor 308 turns "off" SCR 310 which is normally biased "on" by biasing resistors 312, 314 and 316. Capacitor 308 then charges through resistors 312, 314 and 316 until the gate electrode of SCR 310 again becomes forward biased. SCR 310 then fires generating a negative pulse through capacitor 308 to turn SCR 304 "off." Thus, upon receipt of the pulse on line 202, reset pulser 300 generates a single short-duration pulse (approximately 40 milli seconds) at the anode of SCR 304 for energizing reset coil 406 of vibration responsive switch 400. In this manner, the vibration responsive switch 400 is reset immediately following the start delay interval such that switch 410 will be placed in its normal state, as illustrated, even though it may have been previously tripped during startup of the compressor or monitored apparatus 10.

If the compressor is running normally at this time, the control circuit of the present invention will remain in the abovedescribed standby or quiescent condition until an acceleration disturbance occurs.

In the event of such a disturbance, switch 410 will be tripped such that contact 408 moves away from fixed contact 412 and into engagement with contact 414. Operating potential on line 102 will then be fed through contacts 408 and 414, line 404 and resistor 706 to power bus 709 of sample inhibit circuit 700 and thence through diode 710 and line 604 to the timing capacitor 610 of monitor delay network 600. Capacitor 610 will then begin to charge through resistors 606 and 608.

The operating potential on line 404 will also be fed through contacts 516 and 518 of latching relay 500, contacts 520 and 520 of push-to-test switch 522, coil 528, line 504 and resistor 630 to normally "off" SCR 624 of monitor delay network 600. Thus, upon the build-up of a sufficient charge across capacitor 610 to fire unijunction transistor 612 which in turn fires SCR 614, a current path through coil 528 will be established to cause relay 500 to latch "on" thereby actuating switches 510 and 512 and shutting down the compressor. The firing of unijunction transistor 612, however, occurs only after the monitor delay interval set by potentiometer 616 and the charging rate of capacitor 610 and which represents the interval over which the acceleration disturbance must persist in order to cause system shutdown.

In order to insure that a single disturbance does not shutdown the system, the vibration responsive switch 400 is "sampled" a number of times during the monitor delay interval by resetting the same after a relatively short sample delay interval. If the disturbance persists, the vibration responsive switch 400 will be tripped after it is reset and the above described choring of capacitor 610 will be continued.

The sample sequence is unitiated by the initial tripping of switch 400 which applies power from line 102 through contacts 408 and 414, line 404, resistor 706 and line 702 to sample delay network 800. Operating potential is then applied through timing resistors 816 and 818 to unijunction transistor 814 which fires as soon as the charge across capacitor 808 reaches the peak point voltage of transistor 814. As mentioned above, prior to the lapsing of the start delay interval, transistor 730 of sample inhibit network 700 is forward biased tying line 704 to ground and disabling capacitor 808 of sample delay network 800. As soon as the start delay interval lapses, however, a ground return path is established via line 204 to monitor delay network 600 such that the input signal produced across capacitor 610 and fed to sample inhibit network 700 becomes zero causing transistor 730 to become non-conducting. The potential on line 704 therefore rises to very nearly the supply potential on bus 709 whereupon capacitor 808 begins to charge through resistors 804 and 806. Thus, after the start delay interval, and whenever the vibration responsive switch 400 is tripped by an acceleration disturbance, the inhibit signal from network 700 is removed and capacitor 808 of sample delay network 800 begins to charge.

After the expiration of the sample delay interval, the charge across capacitor 808 will be sufficient to fire unijunction transistor 814 which produces a voltage spike at its base-one electrode. This voltage spike is applied to reset pulser 300 which, as described above, provides a single short-duration pulse to reset the coil 406 of switch 400. If the acceleration disturbance persists after switch 400 is reset, the switch will again be tripped to initiate a second sample in the above-described manner.

It should be noted that during the times when vibration responsive switch 400 is tripped, capacitor 610 of monitor delay network 600 will be charging toward the peak point voltage of unijunction transistor 612 as preset by variable resistor 616. After each "sample" reset, the charging of capacitor 610 will stop until vibration responsive switch 400 is once again tripped. However, the discharge time of capacitor 610 is relatively long as compared with the charge time thereof such that the short-duration interruptions between samples has little effect on the overall monitor delay.

If the acceleration disturbance ceases after the initial sample or samples, but prior to the end of the monitor delay interval, the vibration responsive switch 400 will remain in its illustrated position after being reset by sample delay network 800 and reset pulser 300 whereupon operating power is removed from the monitor delay network 600, the sample inhibit network 700 and the sample delay network 800 by switch 410. Storage capacitor 610 of monitor delay network 600 will thereafter become discharged and the system once again assumes its standby or quiescent state.

If, on the other hand, the acceleration disturbance persists for more than a predetermined number of samples, the charge built up across capacitors 610 of monitor delay network 600 will reach the peak point voltage for unijunction transistor 612 which then fires. This causes the triggering of SCR 624 which them completes a current inhibit through coil 528 of latching relay 500 actuating switches 510 and 512 and shutting down the compressor.

The charge developed across capacitor 610 is also applied via line 602 to the sample inibit network 700. Upon receipt of this signal, output transistor 730 will become forward biased, grounding line 704 to thereby discharge capacitor 808 of sample delay network 800 through resistor 810 and diode 812. Thus, immediately upon the expiration of the monitor delay interval, sample delay network 800 will be inhibited so as to preclude the generation of a reset pulse for vibration responsive switch 400 simultaneously with the initiation of system shutdown.

In one experiment, variable resistor 616 of monitor delay network 600 was adjusted so that the monitor delay interval was 5-1/2 times that of the sample delay network 800 as preset by variable resistor 818. In that case, five "samples" were taken prior to the lapsing of the monitor delay interval with the sample delay network being inhibited after the fifth "sample." It is noted that variable resistors 616 and 818 may be separately adjusted or may be ganged together if it is desired to maintain a particular relationship between the sample and monitor delay intervals as the same are adjusted.

Push-to-test switch 522 is used to test the operation of the control circuit of the present invention after the start delay interval has elapsed. Upon actuation of switch 522, switch contacts 534 will be closed simulating the tripping of vibration responsive switch 400. At the same time, neon lamp 530 is substituted for coil 528 of the latching relay. Thus, upon actuation of switch 522 and if the control circuit is operating properly, the neon lamp will be lit after the monitor delay interval which signals the firing of SCR 624 of monitor delay network 600. Upon release of switch 522, the system reverts to its normal configuration and will operate in the manner described above.

It can thus be seen that the control circuit of the present invention provides a simple and reliable solid state apparatus for the positive shutdown of any desired apparatus to be monitored in response to only those vibrations or acceleration disturbances which persist over the monitor delay interval which may be readily and conveniently adjusted independently of or in conjunction with the sample delay interval.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. An acceleration responsive control circuit comprising
    switch means having a first position and a second position, said switch means moving to said second position in response to a predetermined acceleration disturbance and being resettable to said first position upon receipt of a reset pulse;
    sampling means connected with said switch means and responsive to movement of said switch means to said second position to generate a reset pulse for said switch means after a first delay interval;
    monitoring means connected with said switch means and said sampling means and having a first state and a second state for providing a control function, said monitoring means normally assuming said first state and being responsive to movement of said switch means to said second position a predetermined number of times during a second delay interval greater than said first delay interval to assume said second state whereby said monitoring means assumes said second state only in response to acceleration disturbances which persist for the duration of said second delay interval; and
    said sampling means including pulsing means connected with said switch means for generating a single pulse upon receipt of a triggering signal, and triggering means connected with said pulsing means for generating a triggering signal after said first delay interval in response to movement of said switch means to said second position.

2. The invention as recited in claim 1 wherein said pulsing means comprises a monostable multivibrator.

3. The invention as recited in claim 2 wherein said monostable multivibrator includes a pair of solid state controlled switches.

4. The invention as recited in claim 3 wherein said solid state controlled switches comprise silicon controlled rectifiers.

5. The invention as recited in claim 1 wherein said triggering means includes transistor switching means having an adjustable preset switching point, and storage means connected with said transistor switching means to develop a switching signal therefor, said storage means cooperating with said transistor switching means to produce actuation thereof after said first delay interval.

6. The invention as recited in claim 5 wherein said transistor switching means includes a unijunction transistor connected with a variable biasing resistor.

7. The invention as recited in claim 6 wherein said storage means includes a storage capacitor connected with said unijunction transistor.

8. The invention as recited in claim 7 wherein said storage means further includes discharge means for said storage capacitor.

9. An acceleration responsive control circuit comprising
- switch means having a first position and a second position, said switch means moving to said second position in response to a predetermined acceleration disturbance and being resettable to said first position upon receipt of a reset pulse;
- sampling means connected with said switch means and responsive to movement of said switch means to said second position to generate a reset pulse for said switch means after a first delay interval;
- monitoring means connected with said switch means and said sampling means and having a first state and a second state for providing a control function, said monitoring means normally assuming said first state and being responsive to movement of said switch means to said second position a predetermined number of times during a second delay interval greater than said first delay interval to assume said second state whereby said monitoring means assumes said second state only in response to acceleration disturbances which persist for the duration of said second delay interval; and
- said monitoring means including transistor switching means having adjustable preset switching point, and storage means connected with said transistor switching means to develop a switching signal therefor, said storage means cooperating with said transistor switching means to produce actuation thereof after said second delay interval.

10. The invention as recited in claim 9 wherein said transistor switching means includes a unijunction transistor connected with a variable biasing resistor.

11. The invention as recited in claim 10 wherein said storage means includes a storage capacitor connected with said unijunction transistor.

12. The invention as recited in claim 11 said monitoring means further includes a solid state controlled switch connected with said unijunction transistor.

13. The invention as recited in claim 12 wherein said solid state controlled switch comprises a silicon controlled rectifier.

14. An acceleration responsive control circuit comprising
- switch means having a first position and a second position, said switch means moving to said second position in response to a predetermined acceleration disturbance and being resettable to said first position upon receipt of a reset pulse;
- sampling means connected with said switch means and responsive to movement of said switch means to said second position to generate a reset pulse for said switch means after a first delay interval;
- monitoring means connected with said switch means and said sampling means and having a first state and a second state for providing a control function, said monitoring means normally assuming said first state and being responsive to movement of said switch means to said second position a predetermined number of times during a second delay interval greater than said first delay interval to assume said second state whereby said monitoring means assumes said second state only in response to acceleration disturbances which persist for the duration of said second delay interval; and
- start delay means connected with said monitoring means and said switch means to prevent operation of said monitoring means during an initial preset start delay interval and to generate a reset pulse for said sampling means after expiration of said start delay interval such that said switch means is reset after said start delay interval.

15. The invention as recited in claim 14 wherein said start delay means includes a constant current source, storage means connected with said constant current source, and transistor switching means connected with said storage means and adapted to be controlled thereby.

16. The invention as recited in claim 15 wherein said start delay means further includes a solid state controlled switch connected with said transistor switching means and said monitoring means, and a pulse forming capacitor connected with said transistor switching means and said sampling means.

17. The invention as recited in claim 16 wherein said constant current source comprises a field-effect transistor, said transistor switching means comprises a unijunction transistor, and said solid state controlled switch comprises a silicon controlled rectifier.

18. An acceleration responsive control circuit comprising
- switch means having a first position and a second position, said switch means moving to said second position in response to a predetermined acceleration disturbance and being resettable to said first position upon receipt of a reset pulse;
- sampling means connected with said switch means and responsive to movement of said switch means to said second position to generate a reset pulse for said switch means after a first delay interval;
- monitoring means connected with said switch means and said sampling means and having a first state and a second state for providing a control function, said monitoring means normally assuming said first state and being responsive to movement of said switch means to said second position a predetermined number of times during a second delay interval greater than said first delay interval to assume said second state whereby said monitoring means assumes said second state only in response to acceleration disturbances which persist for the duration of said second delay interval; and inhibit means connected with said sampling means and said monitoring means to inhibit generation of said reset pulse by said sampling means whenever said monitoring means assumes said second state.

19. The invention as recited in claim 18 wherein said inhibit means comprises a plurality of transistors interconnected between said monitoring means and said sampling means and providing a feedback path therebetween.

* * * * *